US008538800B2

(12) United States Patent
Gupta et al.

(10) Patent No.: US 8,538,800 B2
(45) Date of Patent: Sep. 17, 2013

(54) EVENT-BASED ANALYSIS OF BUSINESS OBJECTIVES

(75) Inventors: Ajay Gupta, New Delhi (IN); Sharad Nandwani, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1203 days.

(21) Appl. No.: 11/804,944

(22) Filed: May 21, 2007

(65) Prior Publication Data

US 2008/0294471 A1 Nov. 27, 2008

(51) Int. Cl.
*G06Q 10/00* (2012.01)

(52) U.S. Cl.
USPC ........................................................ 705/7.39

(58) Field of Classification Search
USPC ........................................................ 705/7.39
See application file for complete search history.

(56) References Cited

U.S. PATENT DOCUMENTS

| | | | |
|---|---|---|---|
| 6,499,034 B1 | 12/2002 | MacKinlay | |
| 6,792,458 B1 | 9/2004 | Muret et al. | |
| 6,876,988 B2* | 4/2005 | Helsper et al. | 706/21 |
| 7,023,440 B1 | 4/2006 | Havekost et al. | |
| 7,634,423 B2* | 12/2009 | Brocklebank | 705/7.29 |
| 7,711,670 B2* | 5/2010 | Roediger | 706/46 |
| 7,848,947 B1* | 12/2010 | McGloin et al. | 705/7.42 |
| 7,930,236 B2* | 4/2011 | Error et al. | 705/37 |
| 7,945,463 B2* | 5/2011 | Sussman et al. | 705/5 |
| 7,962,463 B2* | 6/2011 | Cava | 707/706 |
| 2002/0049687 A1 | 4/2002 | Helsper et al. | |
| 2002/0087679 A1 | 7/2002 | Pulley et al. | |
| 2003/0144868 A1* | 7/2003 | MacIntyre et al. | 705/1 |
| 2003/0144897 A1* | 7/2003 | Burruss et al. | 705/10 |
| 2003/0187719 A1* | 10/2003 | Brocklebank | 705/10 |
| 2004/0174397 A1 | 9/2004 | Cereghini et al. | |
| 2005/0071737 A1* | 3/2005 | Adendorff et al. | 715/500 |
| 2005/0154769 A1* | 7/2005 | Eckart et al. | 707/201 |
| 2005/0177413 A1* | 8/2005 | Blumberg et al. | 705/10 |
| 2005/0223093 A1* | 10/2005 | Hanson et al. | 709/224 |
| 2005/0262240 A1 | 11/2005 | Drees et al. | |
| 2006/0010164 A1* | 1/2006 | Netz et al. | 707/104.1 |
| 2006/0123022 A1 | 6/2006 | Bird | |
| 2006/0277087 A1* | 12/2006 | Error | 705/8 |
| 2007/0005477 A1* | 1/2007 | McAtamney | 705/35 |
| 2007/0033104 A1* | 2/2007 | Collins et al. | 705/14 |
| 2007/0050237 A1 | 3/2007 | Tien et al. | |
| 2007/0055564 A1 | 3/2007 | Fourman | |
| 2007/0083417 A1* | 4/2007 | Wagner et al. | 705/9 |
| 2007/0094060 A1* | 4/2007 | Apps et al. | 705/7 |
| 2007/0100803 A1* | 5/2007 | Cava | 707/3 |

(Continued)

OTHER PUBLICATIONS

Business Wire ("Hitachi America, Ltd. XBRL Business Unit Introduces Xinba(TM) 2.0," Dec. 4, 2006).*

(Continued)

*Primary Examiner* — Peter Choi
*Assistant Examiner* — George H Walker

(57) ABSTRACT

Aspects of the invention relate to displaying on a graph data describing events and data describing key performance indicators (KPIs). The event data describes an occurrence that may influence the performance objectives of a business, such as the appearance of an advertisement for the business in a magazine. The KPI data describes a quantifiable measure of the business's performance, such as the number of sales of a product. The event data and KPI data are received and displayed on a graph so that the business owner can understand the relationship between the events and the KPIs.

20 Claims, 4 Drawing Sheets

(56) References Cited

U.S. PATENT DOCUMENTS

| | | | |
|---|---|---|---|
| 2008/0010142 A1* | 1/2008 | O'Brien et al. | 705/14 |
| 2008/0167992 A1* | 7/2008 | Kokernak et al. | 705/51 |
| 2008/0201397 A1* | 8/2008 | Peng et al. | 708/308 |
| 2008/0208647 A1* | 8/2008 | Hawley et al. | 705/7 |
| 2010/0103177 A1* | 4/2010 | Shinohara et al. | 345/440 |

OTHER PUBLICATIONS

Catherine Mulbrandon, "Average Income in the United States," 2006, downloaded from visualizingeconomics.com on Oct. 10, 2011.*

Martin Wolk, "Surging oil prices could blunt economic growth," p. 2, 2005, downloaded from msnbc.com on Oct. 10, 2011.*

"Web Trends 7.1 Report User's Guide," Mar. 2005, pp. I-VIII, 1-82, retrieved May 3, 2012 from http://product.webtrends.com/WRC/7.1/documents/ReportUsersGuide.pdf.*

"WebTrends Guide to Web Analytics," Jan. 2005, pp. I-X, 1-224, retrieved May 3, 2012 from http://product.webtrends.com/WRC/7.1/documents/WebAnalytics.pdf.*

"Mercury Quality Center Dashboard," 2005, Mercury Initiative Corporation.

Jonathan Polito, SAS® Web Analytics 5.2: What's New?, pp. 1-19.

Stephen G. Eick, "Visualizing Online Activity," Aug. 2001, pp. 45-50, vol. 44, No. 8, Communications of the ACM.

* cited by examiner

EVENT-BASED ANALYSIS OF BUSINESS OBJECTIVES

TECHNICAL FIELD

The present disclosure relates to methods and apparatus for helping businesses that sell products or services on the Internet meet their business objectives.

BACKGROUND

The Internet may be a useful tool for businesses seeking to sell products or services. Businesses frequently use the Internet by creating a web site that includes information about their products and/or services. Such a business often hosts its web site on a web server that makes the business's web site available via the Internet. Once the business's web site is hosted on a web server, potential customers all over the world can then learn about the business and its products or services. These customers may purchase products or services from the business through the business's web site, or alternatively, customers may purchase products or services through other means such as the telephone or conventional mail. The product or service may be delivered to the customer via the Internet (e.g., computer software that is downloaded to the customer's computer), via conventional mail, or some other way.

FIG. 1 shows one example of businesses using the Internet to communicate with potential customers. For example, business 110 may create a web site that is hosted on web server 140. Web server 140 has a connection 145 to the Internet 100. Different configurations of web server 140 are possible. For example, web server 140 may consist of a single computer, or alternatively, web server 140 may consist of several computers to accommodate a greater amount of traffic than could be handled by a single computer. Business 110 may access web server 140 directly through its local network 115, over the Internet 100 via its connection 105 to the Internet 100, or in some other way. Customers 160 may use the Internet 100 to access the web site of business 110 that is hosted on web server 140 and may purchase the products or services of business 110.

Alternatively, multiple businesses may host their web sites on a single web server. For example, business 120 may create a web site and have it hosted on web server 150, and business 130 may also host its web site on web server 150. Customers 160 may access the web sites of business 120 and business 130 that are hosted on web server 150.

Web server 150 that is used by business 120 and business 130 may itself be run by web server business 170. Business 120 and business 140 may pay web server business 170 a fee for the service of having their web sites hosted at web server 150. Web server business 170 may additionally provide other related services to business 120 and business 130. For example, web server business 170 may provide services for creating web sites, provide electronic mail services, and/or provide statistics regarding customers that visit a business's web site.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some embodiments of the invention, data describing events and data describing key performance indicators (KPIs) are received. The event data describe an occurrence that may influence the performance objectives of a business, such as the appearance of an advertisement for the business in a magazine. The KPI data describe a quantifiable measure of the business's performance, such as the number of sales of a product. The event data and KPI data are displayed on a graph to facilitate understanding the affect events have on KPIs.

DETAILED DESCRIPTION

Figure 1:
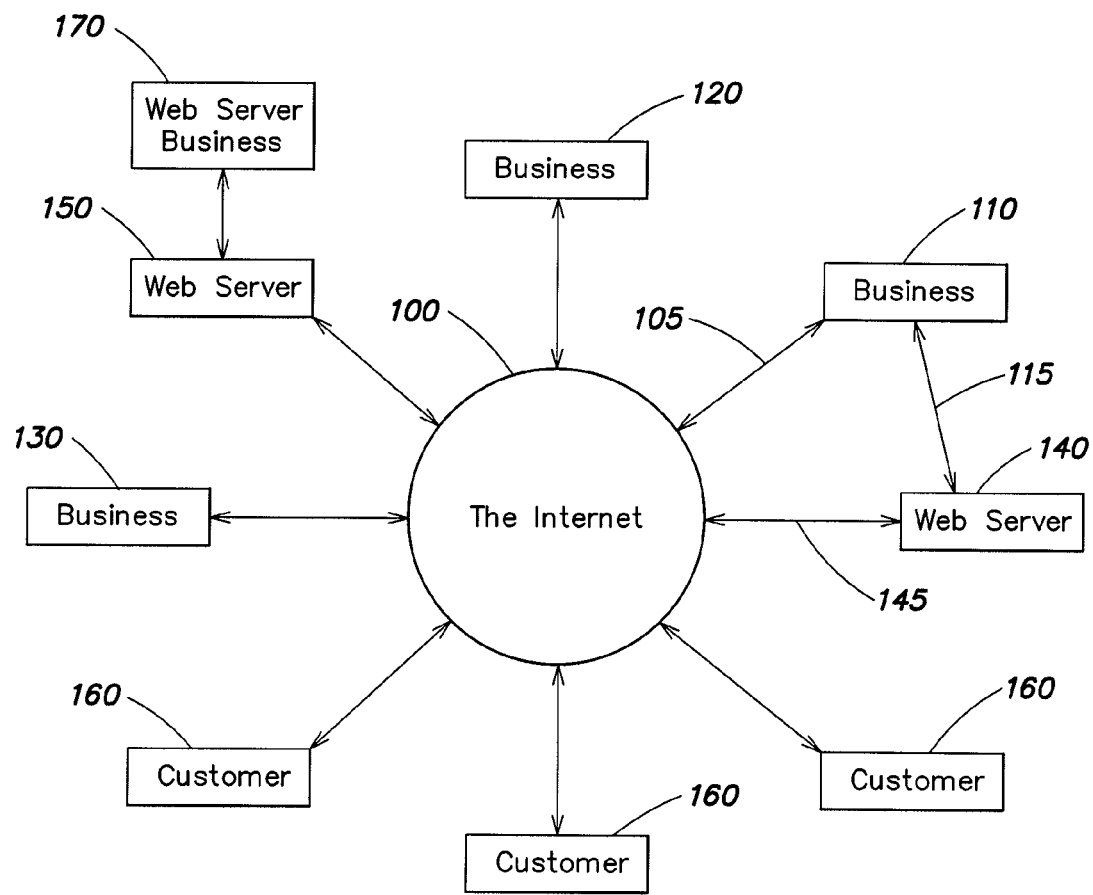
FIG. 1 is a diagram illustrating businesses selling products or services over the Internet to customers of the businesses.

It is frequently desirable for business owners and/or managers to monitor their businesses' performance and to take actions to improve the performance of their businesses. Monitoring the performance of a business may involve quantifying business objectives and presenting them in the form of a metric such that the performance of the business objective may be tracked over time. As used herein, a key performance indicator (KPI) is a quantifiable measure of a business's performance. For example, the number of sales or the gross revenue of the business over a period of time is a quantifiable measure of the performance of the business. Some KPIs that may be important to a business that sells products or services on the Internet include the measurement of web traffic to the web site. These measurements may include the number of visits, unique visitors, new visitors or any other suitable measurement. Other KPIs may include the number of emails or phone calls received from potential customers. The KPIs may be presented on a graph so that the business can monitor the performance of the KPIs over time or over some other independent variable, such as geographical location.

In addition to monitoring KPIs, business owners and/or managers may take some action to attempt to improve the business's performance. An action taken by a business will result in an "event" that may affect the business's KPIs. For example, a business may conduct an email campaign to inform consumers about its products or services, purchase advertisements to appear on web pages, or purchase search-engine keywords so that a link to the business will appear adjacent to a search engine results page for that keyword. Alternatively, the business may redesign its web site to make it more accessible to customers or reduce the prices of its products or services. Other events may impact a business's KPIs without the business having taken any action. For example, when a web crawler of a search engine visits the business's site, the business's web site will be updated for that search engine. In another example, if the business's products or services are reviewed by a third party, then the business may be able to attract new customers. As used herein, an "event" is any occurrence that may influence a business's KPIs, whether the event is instigated by an action of the business or instigated by a third party.

Applicants have appreciated that although systems exist for monitoring KPIs and presenting graphs of KPIs, these systems fail to integrate the presentation of KPI information along with information about events used by businesses to improve the KPIs. Further, Applicants have appreciated that existing KPI graphs do not facilitate understanding the effect that business events have on KPIs. That is, Applicants have appreciated that it is important to understand the return on investment that specific events may have on KPIs in order to better understand what events are likely to be beneficial or harmful in the future. For example, if one event provides no improvement to a business's KPIs, then the managers of the business may determine that the event does little to improve the business's performance. By contrast, if an event greatly improves a business's KPIs, the managers may realize that the event improves performance and may try that same event again at a later time.

In addition, Applicants have appreciated that the impact of an event on KPIs may depend on the timing of the event (e.g., time of day, day of the week, month of the year, or proximity to major holidays, or some other time) and may also depend on the proximity of one event to another event (e.g., two events taken simultaneously may have a greater impact than when taken separately). Applicants have appreciated that, by presenting businesses with information about KPIs with events designed to improve those KPIs, businesses can better understand the impact these events have had on the KPIs and can make more informed decisions with respect to which events to use in the future to improve the KPIs.

Figure 2:
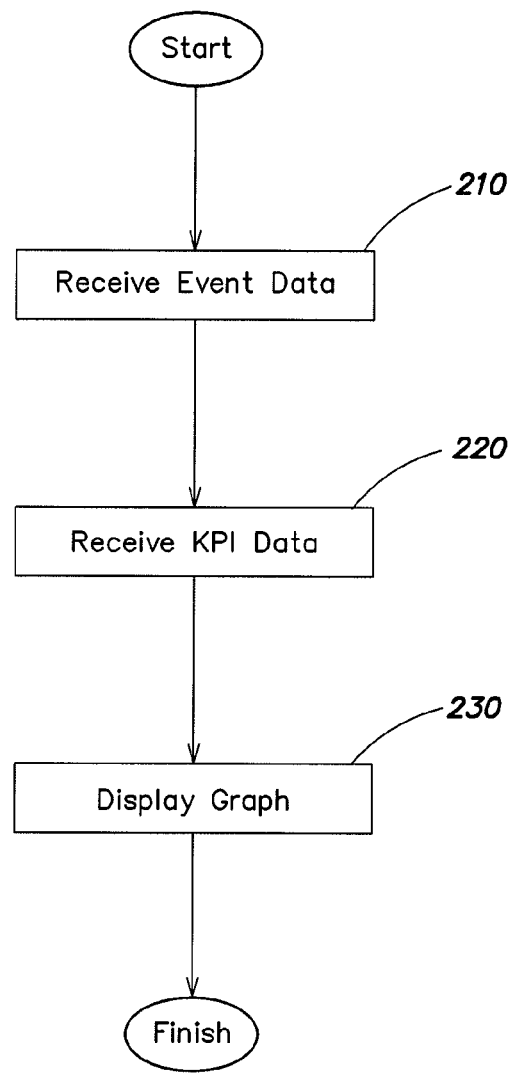
FIG. 2 is a flow chart of an illustrative process for displaying event and KPI information, in accordance with some embodiments of the invention.

FIG. 2 is a flowchart of one example of a process for displaying event data and KPI data in accordance with some embodiments. The process begins at act 210 where event data is received. The process next continues to act 220 where KPI data is received. The process then continues to act 230 where the event data and KPI data are displayed on one or more graphs.

In the process of FIG. 2, event data is received before KPI data. The invention, however, is not limited in this respect as event data and KPI data may be collected in any suitable order and at any suitable time. That is, event data may be collected first, KPI data may be collected first, event data and KPI data may be collected simultaneously, or the data may be collected in any other suitable order. Further, event data and KPI data may be collected in entirety at a single instance, or alternatively, event data and KPI data may be collected incrementally over a period of time. The timing of collecting event and KPI data and the display of the data is also not a limiting feature of the invention. The graph may be updated and displayed during the collection of event and KPI data, the graph may be displayed after all event and KPI data have been collected, or the graph may be displayed at any other appropriate time.

As described above, event data is collected at step 210. Data for any suitable event may be collected, as the invention is not limited in this respect. Examples of some events include those shown in Table 1.

TABLE 1

Examples of Events

| Event | Description |
| --- | --- |
| Email Campaign | A business may send an email message to a list of customers or potential customers to inform them about recent developments with the business's products or services. |
| SMS (Short Message Service) Campaign | Instead of using email, a business may send text messages to the mobile telephones of customers or potential customers. |
| Print Advertising Campaign | A business may buy advertising in print media, such as newspapers or magazines |
| Internet Advertising Campaign | A business may buy banner advertisements to appear on web pages. |
| Internet Coupon Campaign | A business may make internet coupons available, which are similar to advertisements on a web page, that provide a discount on the purchase of a product or service. |
| Website Update | A business may update its website to highlight particular products or services or to make it easier for potential customers to learn about the available products or services. |
| Web Crawler Visit | The web crawler of a search engine may visit the business's web site and index the web site within the search engine. |
| SEM (Search Engine Marketing) | A business may pay to have a link to the business appear in a search engine results page for keywords related to the business's products and services. |
| SEO (Search Engine Optimization) | A business may change the structure and content of its web site to improve its search-engine ranking for keywords related to the business's products and services. |

As described above, KPI data is collected at step 220. Data for any suitable KPI may be collected, as the invention is not limited in this respect. Examples of some KPIs include those shown in Table 2.

TABLE 2

Examples of KPIs

| KPI | Description |
| --- | --- |
| Sales of Products or Services | The number of sales of products and services or the revenue received from the sales of products and services is a measure of the performance of the business. |

TABLE 2-continued

Examples of KPIs

| KPI | Description |
| --- | --- |
| Inventory | The number of products the business has available is an indirect measure of the number of products produced or received and the number of products sold. |
| Emails and Telephone Calls Received | The number of received emails and telephone calls is a measure of customer interest in the business. |
| Number of Web Site Visitors | The number of web site visitors is a measure of customer interest in the business. |
| Page Rank | The rank of a business's site in a search engine results page for relevant keywords is a measure of customer interest in the business. |

Figure 3:
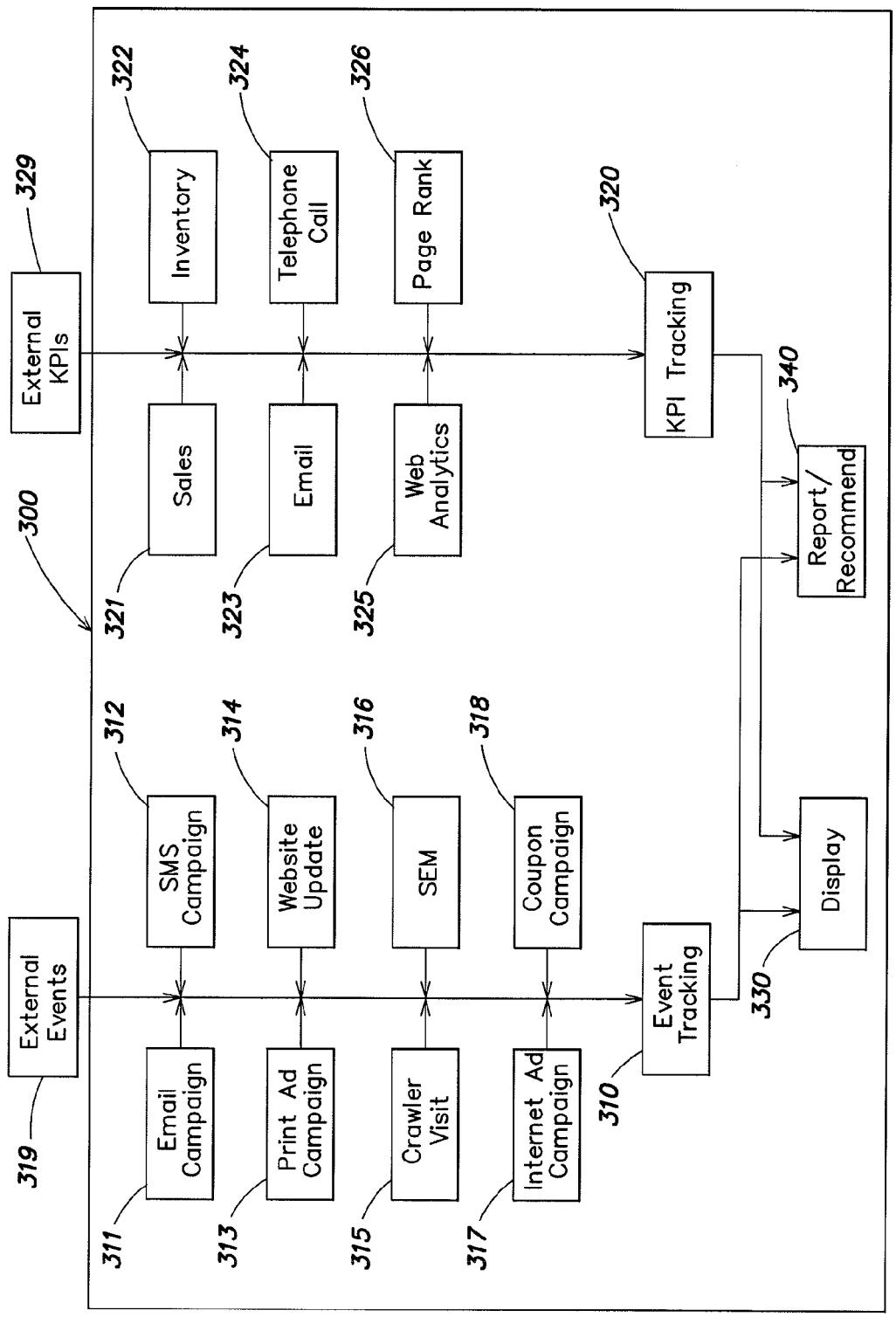
FIG. 3 is a diagram of an illustrative system usable by a businesses to receive event data and KPI data and to display a graph, in accordance with some embodiments of the invention.

Event data and KPI data may be collected in any suitable way, as the invention is not limited in this respect. FIG. 3 illustrates a business management system 300 for collecting event data and KPI data in accordance with some embodiments of the invention. The business management system 300 is implemented in software but other implementations are possible as the invention is not limited in this respect. The business management system 300 of FIG. 3 is made up of software modules, including a software module for event tracking 310, a software module for KPI tracking 320, a software module for displaying event data and KPI data 330, and a software module for generating reports and recommendations for businesses 340. The implementation of the software modules is not a limiting feature of the invention as the software modules may be implemented in any suitable way.

Business management system 300 may allow businesses to take actions to create events and to monitor events. FIG. 3 shows examples of software modules, represented as 311-318, that may be used to track different types of events. The types of events that may be tracked by the software modules is not limited to the types shown in FIG. 3 as the invention is not limited in this respect and any suitable event may be tracked.

Business management system 300 may provide software modules allowing a business to conduct various campaigns to attract new customers. Email campaign 311 is a software module that may provide a business with a list of suitable email addresses or facilitate the business in compiling its own list of suitable email addresses. Email campaign 311 may also assist the business in sending the emails and provide a way for the recipients of the emails to receive further information or to choose not to receive further emails. SMS (short message service) campaign 312 is similar to email campaign 311, except that the recipients may be contacted via text messages sent to their mobile telephones instead of via email. Print advertising campaign 313 may provide a business with information about placing advertisements in print media, such as newspapers or magazines. The information may include the cost of placing the advertisement, the circulation of the publication, and the demographics of the readers. Internet advertising campaign 317 is similar to print advertising campaign 313, except that the advertisements may appear in web pages (e.g., as a banner advertisement) instead of in print publications. Coupon campaign 318 may allow a business to distribute either print or electronic coupons to consumers to provide a discount for the business's products or services.

Business management system 300 may also provide software modules for tracking other events. Website update 314 is a software module that may indicate that a business has updated its website. Website update 314 may monitor the business's website via the Internet to detect updates, may be integrated with a software module used by a business to update its website, or may be implemented in any other suitable manner. Website update 314 may also analyze a business's website and assist the business with search engine optimization (SEO). In returning search results for a particular keyword search, search engines return a search engine results page that comprises a ranked list of relevant web pages for that keyword. Website update 314 may assist a business in conducting SEO by suggesting changes to the website that may increase the web site's page ranking on search engines. Crawler visit 315 may indicate whether the web crawler of a search engine has visited the business's web site to index its content. Crawler visit 315 may be implemented by monitoring the logs of the web server or in any other suitable manner.

Further, business management system 300 may provide a software module for a businesses to conduct search engine marketing (SEM) 316. Alongside their search engine results pages, search engines include links to businesses. The businesses may pay the search engine to have a link to their business included for a particular search keyword. SEM 316 may assist the business in conducting SEM by suggesting relevant keywords, suggesting the maximum price a business should pay for a particular keyword, and assisting the business in purchasing the keywords.

Other events may occur externally of business management system 300. An external event 319 may be communicated to business management system 300 in any suitable way, as the invention is not limited in this respect. In some embodiments, business management system 300, may receive events through an application programming interface (API). An API is an interface that allows different computer programs to interact with each other. For example, a publisher of print media may use the API to communicate an external event relating to the publication of an advertisement to business management system 300. In some embodiments, events may be offline in that the events cannot be communicated to business management system 300 without user intervention. Information about offline events may be entered manually by the business owner, manager, or some other person. For example, when a business owner or manager learns of a review of the business's product in a magazine, the review may be entered manually into the system as an external event.

Information about events are received by event tracking software module 310. Event tracking 310 may receive event information in any suitable way. For example, event tracking 310 may periodically request information about events from other software modules, may passively listen for event information transmitted by other software modules, or may obtain event information in any other suitable manner. Event tracking 310 may also transmit event information to display software module 330. Event tracking 310 may periodically transmit information to display 330, may transmit information when requested by display 330, or may transmit information in any other suitable way.

Business management system 300 may provide software modules via which businesses may track or receive information about KPIs. FIG. 3 shows examples of software modules, represented at 321-326, that may be used to track KPIs, but any suitable KPI may be tracked as the invention is not limited in this respect.

Business management system 300 may provide software modules that allow a business to track KPIs relating to the business's sales and inventory. Sales tracking 321 may provide a business with information relating to the number of sales of its products or services, the revenue received from sales, or any other statistic indicative of sales. Sales tracking 321 may obtain sales information by monitoring the sales made through the business's web site or by any other suitable means. Inventory tracking 322 may provide a business with information relating to the number of products the business has available or any other statistic indicative of the business's inventory. Inventory tracking 322 may obtain information by monitoring sales and additions to inventory, by receiving information external to business management system 300 as an external KPI (described below), or by any other suitable means.

Business management system 300 may provide software modules allowing the business to monitor communications to and from consumers. Email tracking 323 may provide a business with the number of emails received from consumers or sent to consumers regarding purchasing products or services, technical support, complaints, or any other suitable category. Email tracking 323 may receive information from the business's email server, from the business's email software, or by any other suitable means. Telephone call tracking 324 may similarly provide a business with information about the number of telephone calls received from consumers or made to consumers. Telephone call tracking 324 may receive information from the business's PBX (private branch exchange) or by any other suitable means.

Business management system 300 may also provide a software module for tracking web analytics 325. Web analytics is the reporting of statistics relating to the visitors to a web site and the behavior of those visitors. Examples of some statistics that web analytics tracking may include are shown in Table 3, but other statistics may be collected as the invention is not limited in this respect.

TABLE 3

Examples of Web Analytics Statistics

| Statistic | Description |
|---|---|
| New Visits | For a given period of time, the number of visitors who visited a business's web site for the first time. |
| Repeat Visits | For a given period of time, the number of visitors who visited a business's web site and who have previously visited the business's web site. |
| Converted Visits | For a given period of time, the number of visitors who perform a desired action, as specified by the business. |
| Average Page Views Per Visit | The average number of web pages viewed by a visitor on each visit to the business's web site. |
| Average Time Per Visit | The average length of time that a visitor spends at a business's web site. |

Business management system 300 may further provide a software module for page rank tracking 326. As described above, search engines return a search engine results page that comprises a ranked list of relevant web pages for that keyword. Page rank tracking may monitor the page rank of a business's web site for relevant keywords by periodically submitting search requests to search engines.

Other KPIs may be external to business management system 300. An external KPI 329 may be communicated to business management system 300 in any suitable way, as the invention is not limited in this respect. In some embodiments, business management system 300, may receive KPIs through an application programming interface (API). For example, in some embodiments, the business's sales and inventory may be tracked externally of business management system 300, and this information may be communicated to business management system 300 via the API. In some embodiments, KPIs may be offline in that the KPIs cannot be communicated to business management system 300 without user intervention. Information about offline KPIs may be entered manually by the business owner, manager, or some other person. For example, in some embodiments, received telephone calls may not be monitored by business management system 300, and this information may be entered manually.

Information about KPIs are received by KPI tracking software module 320. KPI tracking 320 may receive KPI information in any suitable way. For example, KPI tracking 320 may periodically request information about KPIs from other software modules, may passively listen for KPI information transmitted by other software modules, or may obtain KPI information in any other suitable way. KPI tracking 320 also transmits KPI information to display software module 330. KPI tracking 320 may periodically transmit information to display 330, may transmit information when requested by display 330, or may transmit information in any other suitable way.

In some embodiments, business management system 300 may provide a software module 340 to generate reports and make recommendations to businesses. Report/recommend module 340 may collect statistics about businesses using business management system 300, report these statistics to businesses, and offer recommendations to businesses to help them meet their business objectives.

Report/recommend module 340 may collect general information about the businesses using it such as their size, industry group, and geographical location. This general information may be collected when a business begins to use business management system 300 or at any other suitable time. Report/recommend module 340 may also collect statistics regarding a business's use of business management system 300. For example, business management system 300 may record the actions taken by a business to improve its business objectives and the amount of money the business spent in taking these actions.

Report/recommend module 340 may provide businesses with reports containing statistics relevant to business's operations. In some embodiments, business management system 300 may inform a business how it compares to other businesses of the same size in the same industry group. For example, report/recommend module 340 could report to a business that it spends more money on internet advertising than 90% of similar businesses, has greater sales revenue that 10% of similar businesses, and has a higher page rank than 40% of similar businesses. Report/recommend module 340 may report any relevant statistics as the particular statistics reported is not a limiting feature of the invention.

Report/recommend module 340 may also provide businesses with recommendations to help a business achieve its business objectives. In some embodiments, report/recommend module 340 may generate recommendations by comparing a business to other businesses of the same size in the same industry group, and the recommendations may include actions that a business could take. For example, by comparing a business to similar businesses, report/recommend module 340 could recommend that a business is likely to achieve a significant return on investment by increasing its spending on Internet advertising by 10%.

Referring to FIG. 1, business management system 300 may be provided as a service by web server business 170, whereby web server business 170 may charge a fee to business 120 and to business 130 to use the service for monitoring their KPI's and evaluating the impact of different events on their KPI's. Alternatively, business management system 300 may be sold as a product to a business to implement on its own web server. For example, business 110 may use business management system 300 on its own web server 140.

Figure 4:
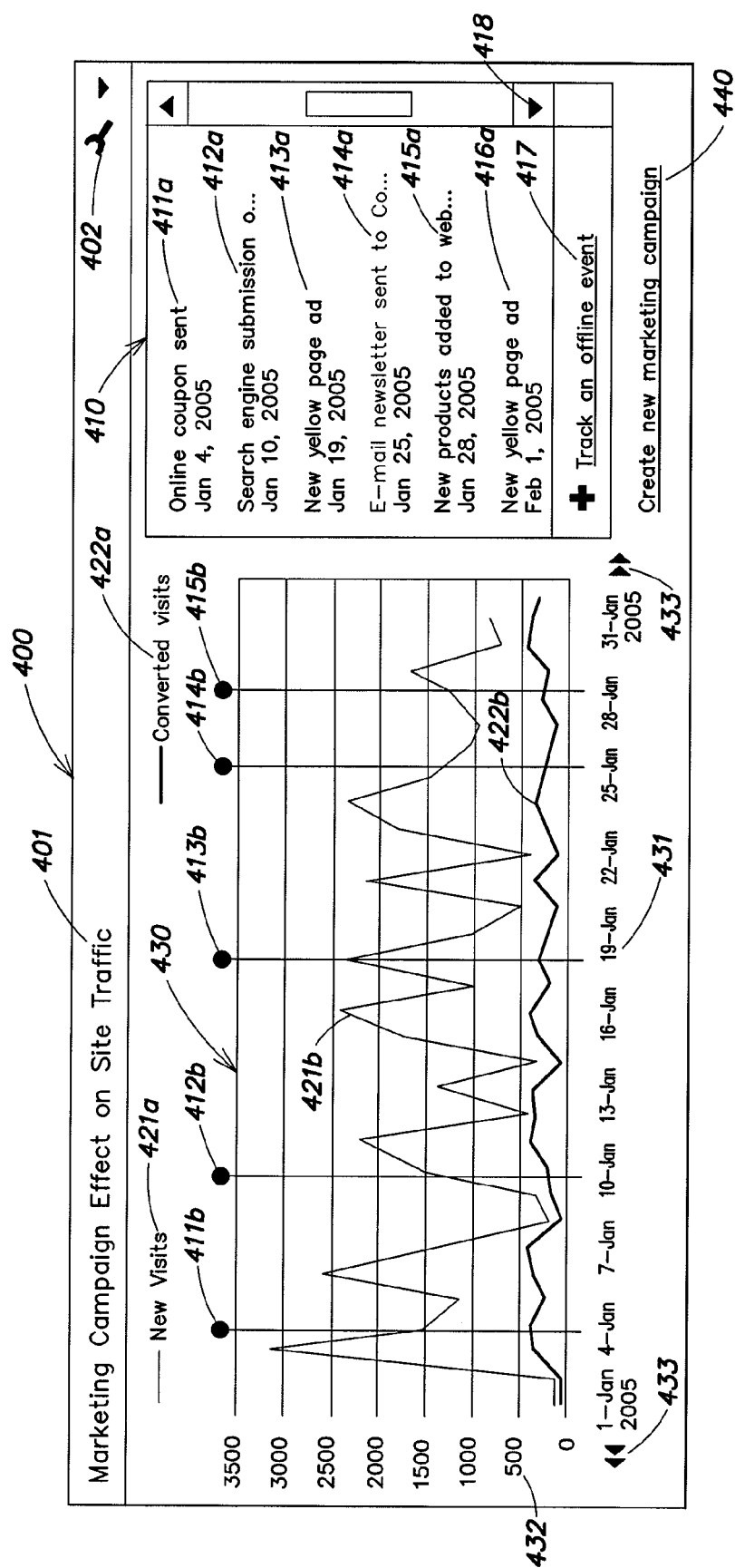
FIG. 4 is an illustrative graph of key performance indicators and events, in accordance with some embodiments of the invention.

Once the event data and KPI data are received, the process of FIG. 2 continues to act 230 where a graph that includes event data and KPI data is displayed. Business management system 300 of FIG. 3 includes a display system 330. FIG. 4 shows a window 400 comprising a graph 430 of event data and KPI data. Graph 430 may be displayed in any suitable way, as the invention is not limited in this respect. For example, graph 430 may be displayed in a window on a computer screen, on a computer web page, in a file, on paper, or in any other suitable manner.

Window 400 comprises a title 401, buttons 402 that allow a user to modify the appearance of the window, a graph of event data and KPI data 430, and a listing of events 410. The layout of window 400 is merely exemplary and the arrangement of the items in the window and the particular items included within the window are not limiting features of the invention. Further, the number of events and KPIs displayed is not a limiting feature and any suitable number of events and KPIs may be displayed.

Graph 430 shows a line graph displaying a first KPI 421*b* and a second KPI 422*b* as a function of time. It should be appreciated that the KPIs need not be presented as a line graph and may be presented as a pie chart, a bar chart, or any other suitable chart or graph. The first KPI 421*b* represents "New visits" as indicated by label 421*a* and the second KPI 422*b* represents "Converted visits" as indicated by label 422*a*. The user may be able to select which KPIs are to be displayed and the total number of KPIs to be displayed through buttons 402 or by any other suitable means The independent variable on horizontal axis 431 of graph 430 represents time, but any suitable independent variable may be used. The dependent variable on vertical axis 432 represents the range of values of the KPIs. One vertical axis is shown for the two KPIs, but multiple vertical axes may be used if the range is different for different KPIs. Graph 430 includes buttons 433 whereby the user may scroll the graph on the horizontal axis to view the graph for different time periods. Although not show in graph 430, in some embodiments the graph may be scrolled on the vertical axis, and in some embodiments the axes may also be scaled.

Graph 430 shows five events as indicated by reference numbers 411*b*, 412*b*, 413*b*, 414*b*, and 415*b*. The times at which these five events occurred are indicated by where the vertical line crosses the horizontal axis, but the invention is not limited in this respect as any suitable representation could be used to indicate the times at which the events occurred. The descriptions of the events are shown in box 410 where the descriptions of six events are indicated by reference numbers 411*a*, 412*a*, 413*a*, 414*a*, 415*a*, and 416*a*. Event 416*a* does not appear on graph 430 because the time at which the event occurred is not visible on graph 430. In box 410, the user may click on an event description to obtain further information about the event and may use scrollbar 418 to see the descriptions of other events.

In some embodiments, link 417 and link 440 may allow the business add more events. Link 417 with the text "Track an offline event" may bring up another window where the business can manually enter information about events. The manually entered events may then appear in graph 430. Link 440 with the text "Create a new marketing campaign" may bring up another window where the business can take actions that create events. The available actions may include any of the actions described above, for example conducting an email campaign or an Internet advertising campaign.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method comprising:
conducting, by a business management system implemented on a computer, different types of Internet-based marketing campaigns for a business, wherein the different types of Internet-based marketing campaigns comprise two or more of: an email campaign, a search engine marketing campaign, an Internet advertising campaign, and an electronic coupon campaign;
analyzing, by the business management system, a web site of the business;
receiving, by the business management system, key performance indicator (KPI) data for different key performance indicators of the web site of the business, wherein the different key performance indicators comprise two or more of: a number of visitors to the web site, a page rank of the web site, a number of sales, a product inventory, and a number of communications from consumers received by the business;
receiving, by the business management system, event data for each of the different types of Internet-based marketing campaigns, wherein the event data comprises: an action taken by the business, timing of the action, and an amount spent in taking the action;
evaluating, by the business management system, impact of the different types of Internet-based marketing campaigns on the different key performance indicators based on the KPI data and the event data;
generating, by the business management system, a report that includes statistics related to return on investment that the different types of Internet-based marketing campaigns had on the different key performance indicators and one or more recommended actions related to Internet-based marketing based on return on investment; and
presenting, by the business management system, a window to display the KPI data and the event data on a screen of the computer, the window comprising:
a graph of the KPI data and the event data showing each different key performance indicator as a function of time and the timing of actions taken by the business in connection with the different types of Internet-based marketing campaigns for displaying the impact of the different types of Internet-based marketing campaigns on the different key performance indicators,
a listing of the actions taken by the business in connection with the different types of Internet-based marketing campaigns for allowing a user of the computer to select an action and obtain further information about the selected action, and
a link to a new window for allowing the user to create a new Internet-based marketing campaign and take one or more actions related to the new Internet-based marketing campaign based on the report and the one or more recommended actions.

2. The method of claim 1, wherein each different key performance indicator is presented as a line graph.

3. The method of claim 1, wherein the KPI data and the event data are automatically received by the business management system, without manual input.

4. The method of claim 1, wherein the KPI data and the event data are received via an application programming interface.

5. The method of claim 1, wherein the window further comprises a link for adding an offline event to the graph via manual input by the user.

6. A computer system comprising:
at least one processor configured to execute software modules; and
memory storing one or more business management software modules configured to:
conduct different types of Internet-based marketing campaigns for a business, wherein the different types of Internet-based marketing campaigns comprise two or more of: an email campaign, a search engine marketing campaign, an Internet advertising campaign, and an electronic coupon campaign;
analyze a web site of the business;
receive key performance indicator (KPI) data for different key performance indicators of the website of the business, wherein the different key performance indicators comprise two or more of: a number of visitors to the web site, a page rank of the web site, a number of sales, a product inventory, and a number of communications from consumers received by the business;
receive event data for each of the different types of Internet-based marketing campaigns, wherein the event data comprises an action taken by the business, timing of the action, and an amount spent in taking the action;
evaluate impact of the different types of Internet-based marketing campaigns on the different key performance indicators based on the KPI data and the event data;
generate a report that includes statistics related to return on investment that the different types of Internet-based marketing campaigns had on the different key performance indicators and one or more recommended actions related to Internet-based marketing based on return on investment; and
present a window to display the KPI data and the event data on a computer screen, the window comprising:
a graph of the KPI data and the event data showing each different key performance indicator as a function of time and the timing of actions taken by the business in connection with the different types of Internet-based marketing campaigns for displaying the impact of the different types of Internet-based marketing campaigns on the different key performance indicators,
a listing of the actions taken by the business in connection with the different types of Internet-based marketing campaigns for allowing a user of the computer system to select an action and obtain further information about the selected action, and
a link to a new window for allowing the user to create a new Internet-based marketing campaign and take one or more actions related to the new Internet-based marketing campaign based on the report and the one or more recommended actions.

7. The computer system of claim 6, wherein each different key performance indicator is presented as a line graph.

8. The computer system of claim 6, wherein the KPI data and the event data are automatically received by the computer system, without manual input.

9. The computer system of claim 6, wherein the KPI data and the event data are received via an application programming interface.

10. The computer system of claim 6, wherein the window further comprises a link for adding an offline event to the graph via manual input by the user.

11. At least one computer memory device encoded with instructions that, when executed, cause a computer to perform a method comprising:
  conducting, by a business management system implemented on the computer, different types of Internet-based marketing campaigns for a business, wherein the different types of Internet-based marketing campaigns comprise two or more of: an email campaign, a search engine marketing campaign, an Internet advertising campaign, and an electronic coupon campaign;
  analyzing, by the business management system, a web site of the business;
  receiving, by the business management system, key performance indicator (KPI) data for different key performance indicators of the web site of the business, wherein the different key performance indicators comprise two or more of: a number of visitors to the web site, a page rank of the web site, a number of sales, a product inventory, and a number of communications from consumers received by the business;
  receiving, by the business management system, event data for each of the different types of Internet-based marketing campaigns, wherein the event data comprises: an action taken by the business, timing of the action, and an amount spent in taking the action;
  evaluating, by the business management system, impact of the different types of Internet-based marketing campaigns on the different key performance indicators based on the KPI data and the event data;
  generating, by the business management system, a report that includes statistics related to return on investment that the different types of Internet-based marketing campaigns had on the different key performance indicators and one or more recommended actions related to Internet-based marketing based on return on investment; and
  presenting, by the business management system, a window to display the KPI data and the event data on a screen of the computer, the window comprising:
    a graph of the KPI data and the event data showing each different key performance indicator as a function of time and the timing of actions taken by the business in connection with the different types of Internet-based marketing campaigns for displaying the impact of the different types of Internet-based marketing campaigns on the different key performance indicators,
    a listing of the actions taken by the business in connection with the different types of Internet-based marketing campaigns for allowing a user of the computer to select an action and obtain further information about the selected action, and
    a link to a new window for allowing the user to create a new Internet-based marketing campaign and take one or more actions in connection with conducting the new Internet-based marketing campaign based on the report and the one or more recommended actions.

12. The at least one computer memory device of claim 11, wherein each different key performance indicator is presented as a line graph.

13. The at least one computer memory device of claim 11, wherein the KPI data and the event data are automatically received by the business management system, without manual input.

14. The at least one computer memory device of claim 11, wherein the KPI data and the event data are received via an application programming interface.

15. The at least one computer memory device of claim 11, wherein the window further comprises a link for adding an offline event to the graph via manual input by the user.

16. The method of claim 1, wherein the report further includes a comparison of spending related to Internet-based marketing with respect to other businesses that are similar to the business.

17. The computer system of claim 6, wherein the report further includes a comparison of spending related to Internet-based marketing with respect to other businesses that are similar to the business.

18. The method of claim 4, wherein:
  the application programming interface is used by a publisher of print media to communicate an external event related to publication of an advertisement for the business, and
  the external event is included in the graph of the KPI data and the event data.

19. The computer system of claim 9, wherein:
  the application programming interface is used by a publisher of print media to communicate an external event related to publication of an advertisement for the business, and
  the external event is included in the graph of the KPI data and the event data.

20. The at least one computer memory device of claim 14, wherein:
  the application programming interface is used by a publisher of print media to communicate an external event related to publication of an advertisement for the business, and
  the external event is included in the graph of the KPI data and the event data.

* * * * *